US005513431A

United States Patent [19]

Ohno et al.

[11] Patent Number: 5,513,431

[45] Date of Patent: May 7, 1996

[54] METHOD FOR PRODUCING THE HEAD OF AN INK JET RECORDING APPARATUS

[75] Inventors: Yoshihiro Ohno; Nagano; Japan

[73] Assignee: Seiko Epson Corporation, Tokyo, Japan

[21] Appl. No.: 259,554

[22] Filed: Jun. 14, 1994

Related U.S. Application Data

[60] Continuation of Ser. No. 25,850, Mar. 3, 1993, abandoned, which is a division of Ser. No. 757,691, Sep. 11, 1991.

[30] Foreign Application Priority Data

| | | | |
|---|---|---|---|
| Sep. 21, 1990 | [JP] | Japan | 2-252252 |
| Nov. 14, 1990 | [JP] | Japan | 2-307855 |
| Nov. 15, 1990 | [JP] | Japan | 2-309335 |
| Jun. 12, 1991 | [JP] | Japan | 3-140009 |

[51] Int. Cl.[6] .......... B23P 15/00

[52] U.S. Cl. .......... 29/890.1

[58] Field of Search .......... 29/890.1, 611; 347/54

[56] References Cited

U.S. PATENT DOCUMENTS

| | | | |
|---|---|---|---|
| 4,203,128 | 5/1980 | Guckel | 357/60 |
| 4,234,361 | 11/1980 | Guckel | 148/146 |
| 4,312,008 | 1/1982 | Taub et al. | 346/140 R |
| 4,520,375 | 5/1985 | Kroll | 346/140 |
| 4,725,851 | 2/1988 | Sutera | 29/890.1 |
| 4,733,447 | 3/1988 | Ageishi | 29/890.1 |
| 5,163,177 | 11/1992 | Komura | 29/890.1 |

FOREIGN PATENT DOCUMENTS

| | | | |
|---|---|---|---|
| 2080252 | of 0000 | Japan . | |
| 56-142071 | of 0000 | Japan . | |
| 0224760 | 12/1983 | Japan | 29/890.1 |
| 1289351 | 11/1990 | Japan . | |

OTHER PUBLICATIONS

Patent Abstracts of Japan, Publication No. JP2080252, Abstract Publication Date: Jun. 12, 1990, Abstract vol. 014271.

Abstract of Japanese Patent Publication 56-142071 (A), vol. 6, No. 23 (M-111) (901) Feb. 10, 1982.

*Primary Examiner*—Irene Cuda
*Attorney, Agent, or Firm*—W. Glen Johnson

[57] ABSTRACT

An ink-jet recording apparatus includes an ink-jet head which includes a plurality of nozzle openings, a plurality of independent ejection chambers respectively correspondingly communicatd with the nozzle openings, diaphragms respectively correspondingly formed in the ejection chambers partly on at least one side walls of the ejection chambers, a plurality of driving elements for respectively correspondingly driving the diaphragms, and a common ink cavity for supplying ink to the plurality of ejection chambers, so that upon application of electric pulses to the plurality of driving means, the driving elements respectively correspondingly distort the diaphragms in the direction of increasing the respective pressures in the ejection chambers to eject ink drops from the nozzle openings onto recording paper, wherein the respective driving elements are constituted by electrodes for respectively correspondingly distorting the diaphragms by electrostatic force, the electrodes being formed on a substrate.

15 Claims, 11 Drawing Sheets

METHOD FOR PRODUCING THE HEAD OF AN INK JET RECORDING APPARATUS

This is a continuation of application Ser. No. 08/025,850 filed on Mar. 3, 1993 now abandoned, which is a divisional application of Ser. No. 07/757,691 filed Sep. 11, 1991.

BACKGROUND OF THE INVENTION

1. Field of the Invention

The present invention relates to an ink-jet recording apparatus in which ink drops are ejected so as to be deposited on a surface of recording paper only when recording is required. In particular, the present invention relates to a small-sized high-density ink-jet recording apparatus produced through application of a micro-machining technique, and relates to a method for producing an ink-jet head as a main part of such an ink-jet recording apparatus.

2. Description of the Prior Art

Ink-jet recording apparatuses are advantageous in many points that noise is extremely low at the time of recording, high-speed printing can be made, the degree of freedom of ink is so high that inexpensive ordinary paper can be used, and so on. Among those ink-jet recording apparatuses, an ink-on-demand type apparatus in which ink drops are ejected only when recording is required has been the focus of attention because it is not necessary to recover ink drops unnecessary for recording.

In such an ink-on-demand type apparatus, as described, for example, in Japanese Patent Postexamin. Publication No. Hei-2-51734, a print head is constituted by: a plurality of nozzle openings arranged in parallel to each other to eject ink drops therefrom; a plurality of independent ejection chambers respectively communicated with the corresponding nozzle openings and each having walls one of which is partly formed to serve as a diaphragm; a plurality of piezoelectric elements respectively attached on the corresponding diaphragms so as to serve as electromechanical transducers; and a common ink cavity for supplying ink to the each of the ejection chambers. In such a print head, upon application of a printing pulse voltage to any one of the piezo electric elements, the diaphragm corresponding to the one piezoelectric element is mechanically distorted so that the volume of the ejection chamber corresponding to the diaphragm is reduced and the pressure in the chamber is increased instantaneously. As a result, an ink drop is ejected from the corresponding one of the nozzle openings toward recording paper.

In the aforementioned structure of the conventional ink-jet recording apparatus, however, much labor as well as much time are required for mounting such piezoelectric elements on the ejection chambers because the piezoelectric elements must be stuck onto the outside of the ejection chambers through glass or resin plates forming the diaphragms or must be arranged in the inside of the ejection chambers. Particular in the latest printers, both a high speed and a high printing quality are required so that there is a tendency that the number of the nozzle openings for ejecting ink drops are increased. Piezoelectric elements corresponding to the nozzle openings are machined by dicing or by means of a wire saw and then placed in predetermined positions through an adhesive agent or the like. In the case of a high-density ink-jet recording apparatus having a large number of nozzle openings, if machining is required to provide the piezoelectric elements, there is a limitation from the viewpoints of machining capability, mechanical accuracy and dimensional accuracy.

Further, there have been distortion errors of the piezoelectric elements due to scattering in production of piezoelectric elements per se, and in some cases, there have been occurrence of variations in ink ejection speed from the respective nozzle openings.

Further, electrodes for driving the piezoelectric elements are respectively formed in the piezoelectric elements per se and then the piezoelectric elements are stuck onto a substrate through an adhesive agent. Accordingly, not only the electrodes must be formed individually in the respective piezoelectric elements but the driving efficiency of the ink-jet recording apparatus is lowered because an adhesive agent layer is interposed between the substrate and the piezoelectric elements so that it is difficult to extend the lifetime of the ink-jet recording apparatus.

Other than the above system in which the diaphragms are driven by the piezoelectric elements, there is a system in which the ink in the ejection chambers is heated (Japanese Patent Postexamin. Publication No. Sho-61-59911). In this system, specifically, the ink in the ejection chambers is heated by a heater so that the pressure in the ejection chambers is increased by the generation of bubbles caused by evaporation of the ink to thereby eject ink drops from the chambers. This heating system has an advantage in that heating resistors can be formed of thin-film resistors of $TaSiO_2$, NiWP or the like by sputtering, CVD, evaporating deposition, plating, or the like. The system, however, has a problem in that the lifetime of the head itself is short because the heating resistors are damaged by repetition of heating/quenching and shock at the time of the breaking of bubbles in the ink.

SUMMARY OF THE INVENTION

It is therefore an object of the present invention to provide an ink-jet recording apparatus which is small in size, high in density, high in printing speed, high in printing quality, long in life and high in reliability, by employing a driving system using electro static force instead of the aforementioned system using piezoelectric elements or heating elements as means for driving diaphragms or vibration plates of ejection chambers.

It is another object of the present invention to provide an ink-jet recording apparatus having a structure which is formed by application of a micro-machining technique and which is suitable for mass-production thereof.

It is a further object of the present invention to provide a method suitable for production of an ink-jet head as a main part of the ink-jet recording apparatus which can attain the foregoing objects.

To attain the foregoing objects, according to the present invention, the ink-jet recording apparatus comprises an ink-jet head including a plurality of nozzle openings, a plurality of independent ejection chambers respectively correspondingly communicated with the nozzle openings, diaphragms respectively correspondingly formed in the ejection chambers partly on at least one side wall of the ejection chambers, a plurality of driving means for respectively correspondingly driving the diaphragms, and a common ink cavity for supplying ink to the plurality of ejection chambers, so that upon application of electric pulses to the plurality of driving means, the driving means respectively correspondingly distort the diaphragms in the direction of increasing the respectively pressures in the ejection chambers to eject ink drops form the nozzle openings onto recording paper, wherein the respective driving means are constituted by electrodes for respectively correspondingly distorting the diaphragms by electrostatic force, the electrodes being formed on a substrate.

The operational principle of the ink-jet recording apparatus is as follows. When a pulse voltage is applied to one electrode, the corresponding diaphragm is attracted and distorted by the negative or positive charge on the surface of the diaphragm and the positive or negative charge on the surface of the electrode corresponding the diaphragm. Then, the volume of the corresponding ejection chamber is reduced by the restoring force of the diaphragm when the electrode is made off. As a result, the pressure in the ejection chamber is increased instantaneously to thereby eject an ink drop from the corresponding nozzle opening. Because the driving of the diaphragms is controlled by such an electrostatic action, not only this apparatus can be produced by a micro-machining technique but the apparatus can be made small in size, high in density, high in printing speed, high in printing quality, and long in lifetime.

According to the present invention, preferably, the ink-jet head has a lamination structure formed by bonding at least three substrates stacked one on another, the ejection chambers respectively having bottom portions used as the diaphragms are provided on an intermediate one of the substrates, and the electrodes are provided on a lowermost one of the substrates so that the electrodes are closely opposite to the diaphragms respectively and correspondingly. Although the respective rear walls of the ejection chambers can be used as the diaphragms, the respectively bottom walls of the ejection chambers are used as the diaphragms through a lamination structure formed by bonding at least three substrates in order to make the apparatus thinner. It is preferable that the electrodes are coated with an insulating film not only to protect the electrodes but to prevent the electrodes from short-circuiting with the diaphragms.

To increase the pressure in each of the ejection chambers, the upper and lower walls of the ejection chamber may be constituted by diaphragms. In this case, the electrodes are provided correspondingly to the respective diaphragms so as to synchronously drive the corresponding diaphragms. Accordingly, the driving voltages of the electrodes can be set to lower values.

Further, preferably, each of the diaphragms is shaped to be a rectangle or a square and each of the diaphragms is supported through bellows-like grooves formed on two opposite sides of or on four sides of the rectangle or square, or alternatively, supported by one side of the rectangle or square in the form of a cantilever, so that the quantity of displacement of the diaphragm is made large. In the case of the cantilever type diaphragm, insulating ink is used because there is a possibility that ink becomes into contact with the electrode portion to make the electrodes shorted to make power supply possible.

Further, preferably, a pair of, first and second, electrodes may be provided for each diaphragm in order to increase the electrostatic action more effectively. In this case, the two electrodes may be arranged so that the first electrode is provided inside a vibration chamber just under the diaphragm while the second electrode is provided outside the vibration chamber, or, alternatively, both the two electrodes may be arranged inside the vibration chamber the two electrodes being connected to an oscillation circuit so that electric pulses opposite to each other in polarity are respectively alternately applied to the two electrodes. Further, by providing a metal electrode opposite to the electrode in the diaphragm, the speed of injection/disappearance of charge can be made high so that it is made possible to realize driving by higher-frequency pulses to thereby obtain a performance of high speed printing.

Further, it is preferable that each vibration chamber is made to communicate with the air through an air passage. The electrodes can be respectively correspondingly disposed in concave portions formed in the substrate.

The nozzle openings may be arranged at equal intervals in an end portion of the intermediate one of the stacked substrates in the form of a so-called edge ink-jet type. Alternatively, the nozzle openings may be arranged at equal intervals in the upper one of the stacked substrates just above the ejection chambers in the form of a so-called face ink-jet type.

The method for producing the ink-jet according to the present invention comprises: a step in which a nozzle substrate (the above-mentioned intermediate substrate or upper substrate) is prepared by anisotropic etching a silicon monocrystal substrate so as to form important portions of the substrate; another step in which an electrode substrate (the above-mentioned lower substrate) is prepared by forming electrodes only or electrodes and an insulating film on a substrate; and a further step in which the nozzle substrate and the electrode substrate are bonded with each other through anodic treatment.

Being in the form of a monocrystal, silicon can be subjected to anisotropic etching. For example, the (100) face can be etched regularly in the direction of 55°. The (111) face can be etched in the direction of 90°. By using this property of silicon, it is possible to form the respective important parts, such as nozzle openings, ejection chambers, orifices, an ink cavity, etc., with high accuracy. Finally, the silicon nozzle substrate and the electrode substrate (constituted by a glass or insulating plate which is near in thermal expansion coefficient to silicon) in which electrodes and an insulating film are formed are put on each other and heated at a temperature of 300° C. to 500° C. At the same time, a voltage of the order of hundreds of volts is applied between the silicon side as an anode and the electrode substrate side as a cathode to stick the substrate to each other through anodic bonding. Thus, an ink-jet head being high in airtightness can be produced.

DESCRIPTION OF THE PREFERRED EMBODIMENTS

Embodiments of the present invention will be described hereunder with reference to the drawings.

Embodiment 1

Figure 1:
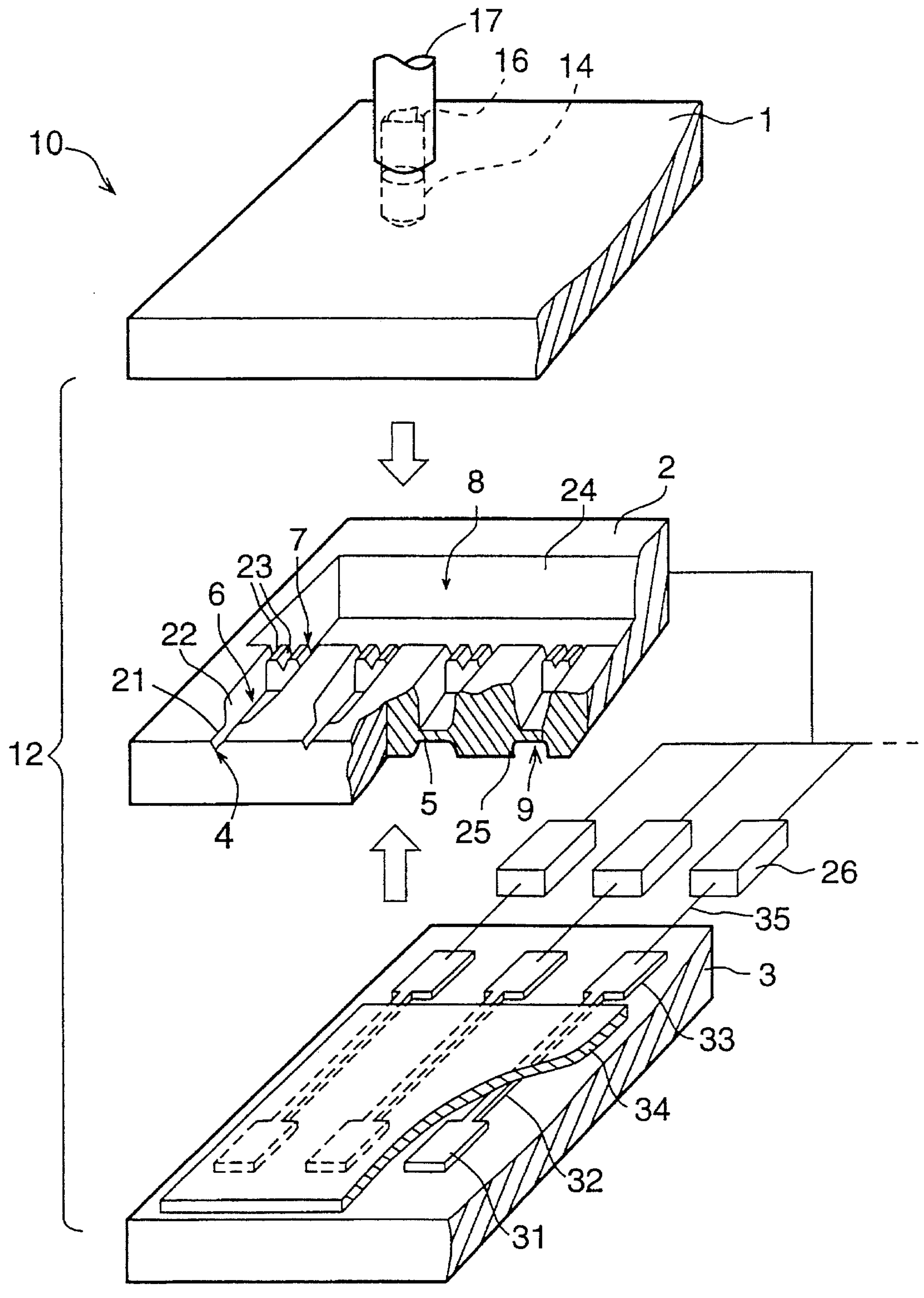
FIG. 1 is an exploded perspective view partly in section, showing main parts of a first embodiment of the present invention.
Figure 2:
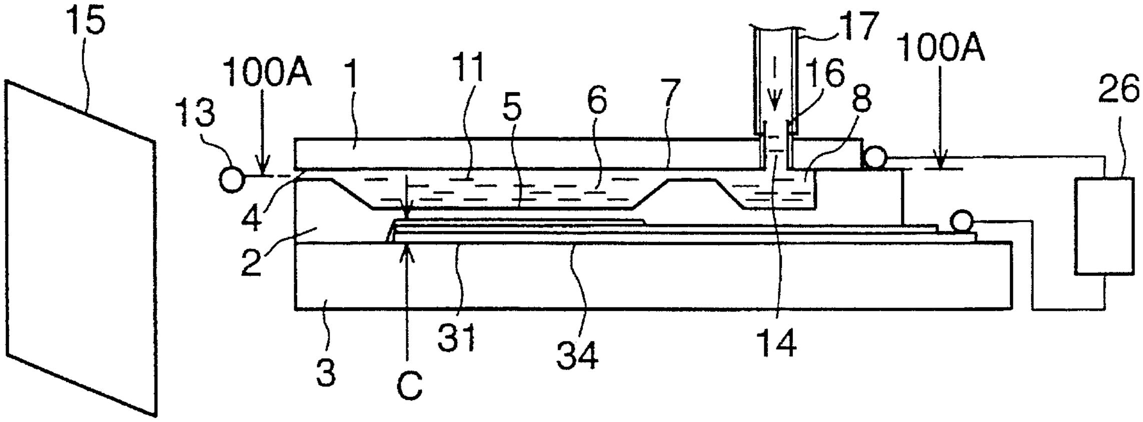
FIG. 2 is a sectional side view of the first embodiment of FIG. 1 after assembly.
Figure 3:
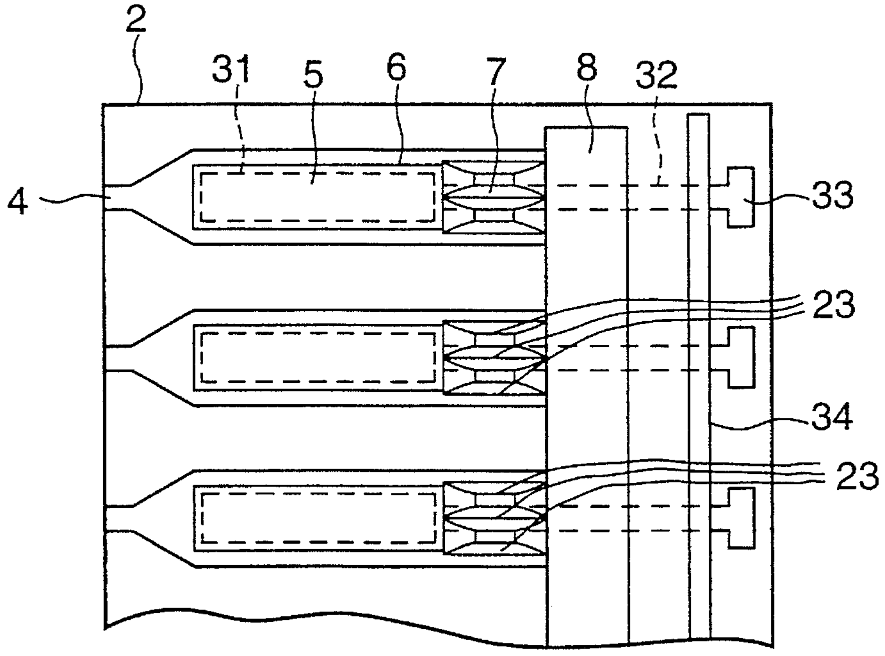
FIG. 3 is a view taken on line 100A of FIG. 2.

FIG. 1 is a partly exploded perspective view partly in section, of an ink-jet recording apparatus according to a first embodiment of the present invention. The illustrated embodiment relates to an edge ink-jet type apparatus in which ink drops are ejected from nozzle openings formed in an end portion of a substrate. FIG. 2 is a sectional side view of the whole apparatus after assembly. FIG. 3 is a view taken on line 100A of FIG. 2.

AS shown in the drawings an ink-jet head 12 as a main portion of an ink-jet recording apparatus 10 has a lamination structure in which three substrates 1, 2 and 3 are stuck to one another as will be described hereunder.

An intermediate substrate 2 such as a silicon substrate has: a plurality of nozzle grooves 21 arranged at equal intervals on a surface of the substrate and extending in parallel to each other from an end thereof to form nozzle openings; concave portions 22 respectively communicated with the nozzle grooves 21 to form ejection chambers 6 respectively having bottom walls serving as diaphragms 5; fine grooves 23 respectively provided in the rear of the concave portions 22 and serving as ink inlets to form orifices 7; and a concave portion 24 to form a common ink cavity 8 for supplying in to the respective ejection chambers 6. Further, concave portions 25 are respectively provided under the diaphragms 5 to form vibration chambers 9 so as to mount electrodes as will be described later. The nozzle grooves 21 are arranged at intervals of the pitch of about 2 mm. The width of each nozzle groove 21 is selected to be about 40 μm.

For example, the upper substrate 1 stuck onto the upper surface the intermediate substrate 2 is made by glass or resin. The nozzle openings 4, the ejection chambers 6, the orifices 7 and the ink cavity 8 are formed by bonding the upper substrate 1 on the intermediate substrate 2. An ink supply port 14 communicated with the ink cavity 8 is formed in the upper substrate 1. The ink supply port 14 is connected to an ink tank not shown, through a connection pipe 14 and a tube 17.

For Example, the lower substrate 3 to be bonded on the lower surface of the intermediate substrate 2 is made by glass or resin. The vibration chambers 9 are formed by bonding the lower substrate 3 on the intermediate substrate 2. At the same time, electrodes 31 are formed on a surface of the lower substrate 3 and in positions corresponding to the respective diaphragms 5. Each of the electrodes 31 has a lead portion 32 and a terminal portion 33. The electrodes 31 and the lead portions 32 except the terminal portions 33 are covered with an insulating film 34. The terminal portions 33 are respectively correspondingly bonded to lead wires 35.

The substrates 1, 2 and 3 are assembled to constitute an ink-jet head 12 as shown in FIG. 2. Further, oscillation circuits 26 are respectively correspondingly connected between the terminal portions 33 of the electrodes 31 and the intermediate substrate 2 to thereby constitute the ink-jet recording apparatus 10 having a lamination structure according to the present invention. Ink 11 is supplied from the ink tank (not shown) to the inside of the intermediate substrate 2 through the ink supply port 14, so that the ink cavity 8, the ejection chambers 6 and the like are filled with the ink. The distance c between the electrode 31 and the corresponding diaphragm 5 is kept to be about 1 μm. In FIG. 2, the reference numeral 13 designates an ink drop ejected designates from the nozzle opening 4, and 15 designates recording paper. The ink used is prepared by dissolving/dispersing a surface active agent such as ethylene glycol and a dye (or a pigment) into a main solvent such as water, alcohol, toluene, etc. Alternatively, hot-melt ink may be used if a heater or the like is provided in this apparatus.

In the following, the operation of this embodiment is described. For example, a positive pulse voltage generated by one of the oscillation circuits 26 is applied to the corresponding electrode 31. When the surface of the electrode 31 is charged with electricity to a positive potential, the lower surface of the corresponding diaphragm 5 is charged with electricity to a negative potential. Accordingly, the diaphragm 5 is distorted downward by the action of the electrostatic attraction. When the electrode 31 is then made off, the diaphragm 5 is restored. Accordingly, the pressure in the ejection chamber 6 increases rapidly, so that the ink drop 13 is ejected from the nozzle opening 4 onto the recording paper 15. Further, the ink 11 is supplied from the ink cavity 8 to the ejection chamber 6 through the orifice 7 by the downward distortion of the diaphragm 5. As the oscillation circuit 26, a circuit for alternately generating a zero voltage and a positive voltage, an AC electric source, or the like, may be used. Recording can be made by controlling the electric pulses to be applied to the electrodes 31 of the respective nozzle openings 4.

Here, the quantity of displacement, the driving voltage and the quantity of ejection of the diaphragm 5 are calculated in the case where the diaphragm 5 is driven as described above.

The diaphragm 5 is shaped like a rectangle with short side length $2a$ and long side length b. The four sides of the rectangle are supported by surrounding walls. When the aspect ratio (b/2a) is large, the coefficient approaches to 0.5, and the quantity of displacement of the thin plate (diaphragm) subjected to pressure P can be expressed by the following formula because the quantity of displacement depends on a.

$$w=0.5\times Pa^4/Eh^3 \quad (1)$$

In the formula, w: the quantity of displacement (m)

p: pressure (N/m$^2$)

a: a half length(m) of the short side h: the thickness k(m) of the plate (diaphragm)

E: Young's modulus (N/m$^2$, silicon $11\times10^{10}$ N/m$^2$)

The pressure of attraction by electrostatic force can be expressed by the following formula.

$$P=\frac{1}{2}\times\epsilon\times(V/t)^2$$

In the formula, $\epsilon$: the dielectric constant (F/m, the dielectric constant in vacuum: $8.8\times10^{-12}$ F/m)

V: the voltage (V)

t: the distance (m) between the diaphragm and the electrode

Accordingly, the driving voltage V required for acquiring necessary ejection pressure can be expressed by the following formula.

$$V=t(2P/\epsilon)^{1/2} \quad (2)$$

Figure 4A:
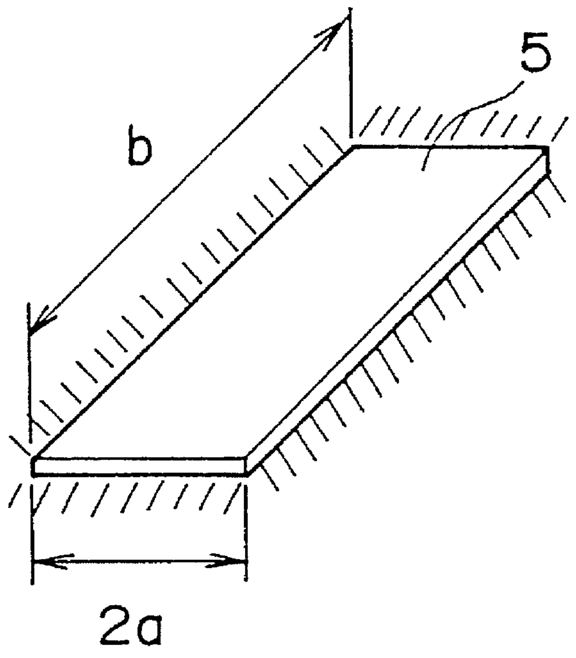
FIGS. 4A and 4B show explanatory views concerning the design of a diaphragm, FIG. 4A being an explanatory view showing the size of a rectangular diaphragm, FIG. 4B being an explanatory view for calculating ejection pressure and ejection quantity.
Figure 4B:
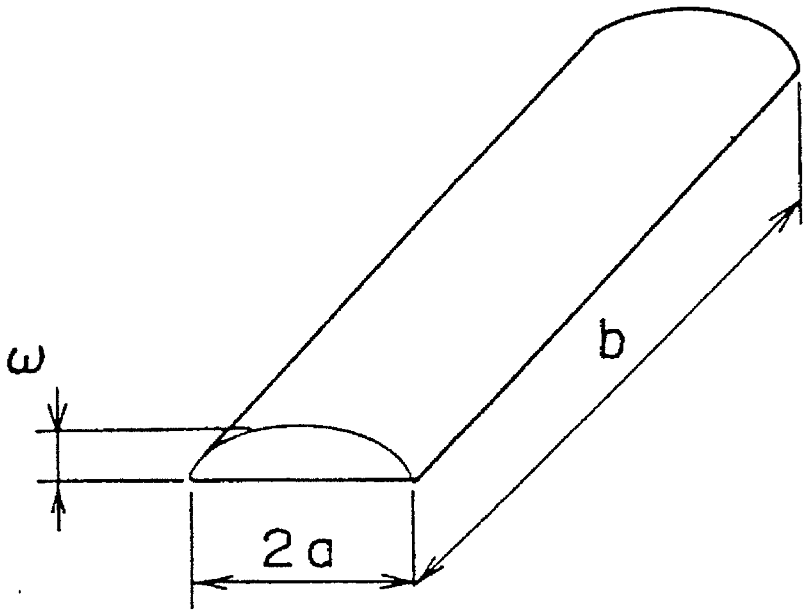

In the following, the volume of a semicylindrical shape as shown in FIG. 4(B) is calculated to thereby calculate the quantity of ejection.

The following formula can be obtained because the equation $\Delta w=4/3\times abw$ is valid.

$$w=\frac{3}{4}\times\Delta w/ab \quad (3)$$

When the formula (3) is substituted into the equation $P=2w\times Eh^3/a^4$ obtained by rearranging the formula (1), the following formula (4) can be obtained.

$$P=\frac{3}{2}\times\Delta Eh^3/a^5b \quad (4)$$

When the formula (4) is substituted into the formula (2), the following formula can be obtained.

$$V=t\times(3Eh^3\Delta w/\epsilon b)^{1/2}\times(1/a^5)^{1/2} \quad (5)$$

That is, the driving voltage required for acquiring the quantity of ejection of ink is expressed by the formula (5).

Figure 5B:
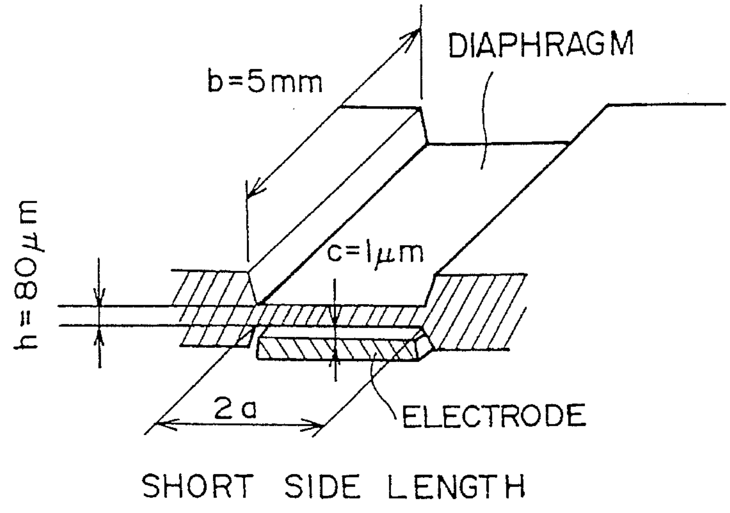
FIG. 5A is a graph showing the relationship between the length of the short side of the diaphragm and the driving voltage and FIG. 5B is shown a detail of the diaphragm portion.
Figure 5A:
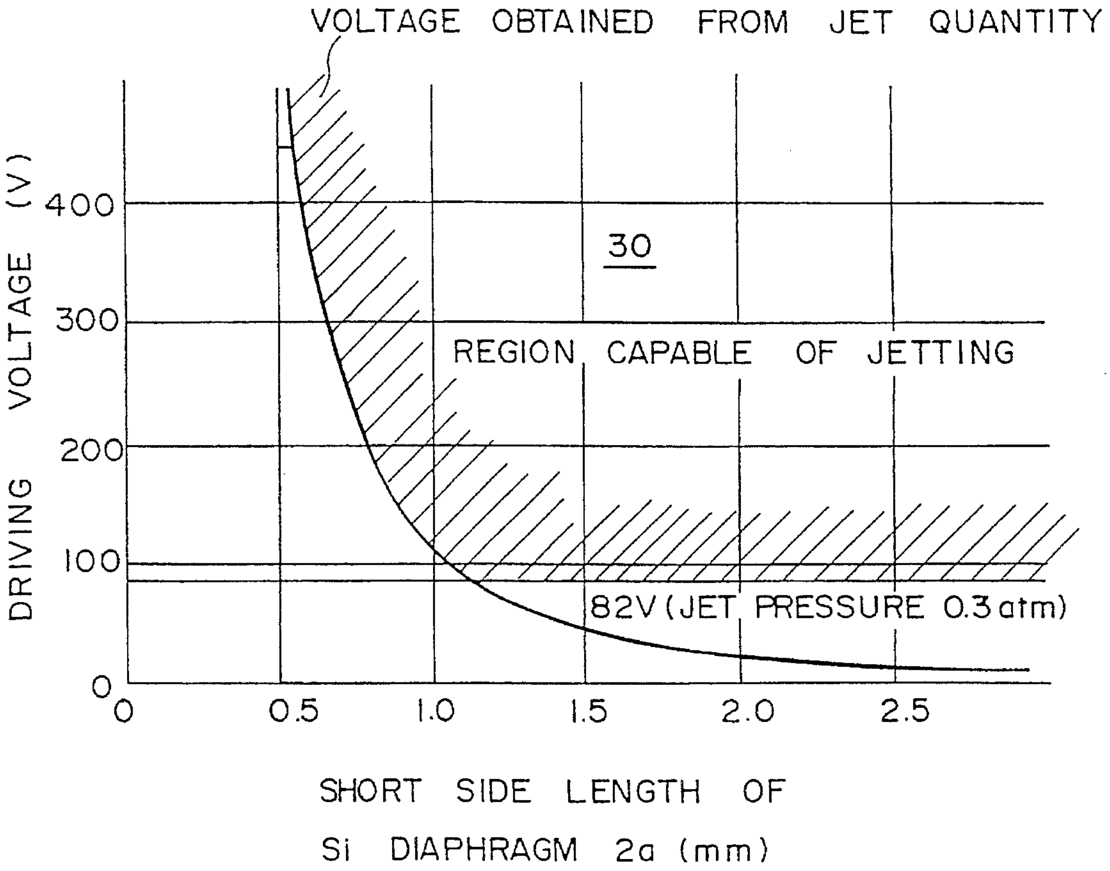

The allowable region of ink ejection as shown in FIG. 5A can be calculated on the basis of the formulae (2) and (5). FIG. 5A shows the relationship between the short side length 2a(mm) and the driving voltage (V) in the case where the long side length b of the silicon diaphragm, the thickness h thereof and the distance c between the diaphragm and the electrode are selected to be 5 mm, 80 μm and 1 μm respectively. The ejection allowable region 30 is shown by the oblique lines in FIG. 5A when the jet (ejection) pressure P is 0.3 atm.

Although it is more advantageous for the diaphragm to make the size of the diaphragm larger, the appropriate width of the nozzle in the direction of the pitch is within a range of from about 0.5 mm to about 4.0 mm in order to make the nozzle small in size and high in density.

The length of the diaphragm is determined according to the formula (4) on the basis of the quantity of ejection of ink as a target, the Young's modulus of the silicon substrate, the ejection pressure thereof and the thickness thereof.

When the width is selected to be about 2 mm, it is necessary to select the thickness of the diaphragm to be about 50 μm or more on the consideration of the ejection rate. If the diaphragm is extremely thicker than the above value, the driving voltage increases abnormally as obvious from the formula (5). If the diaphragm is too thin, the ink-jet ejection frequency cannot be obtained. That is, a large lag occurs in the frequency of the diaphragm relative to the applied pulses for ink jetting.

After the ink-jet head 12 in this embodiment was assembled into a printer, ink drops were flown in the rate of 7 m/sec by applying a voltage of 150 V with 5 KHz. When printing was tried at a rate of 300 dpi, a good result of printing was obtained.

Though not shown, the rear wall of the ejection chamber may be used as a diaphragm. The head itself, however, can be more thinned by using the bottom wall of the ejection chamber 6 as a diaphragm as shown in this embodiment.

Embodiment 2

Figure 6:
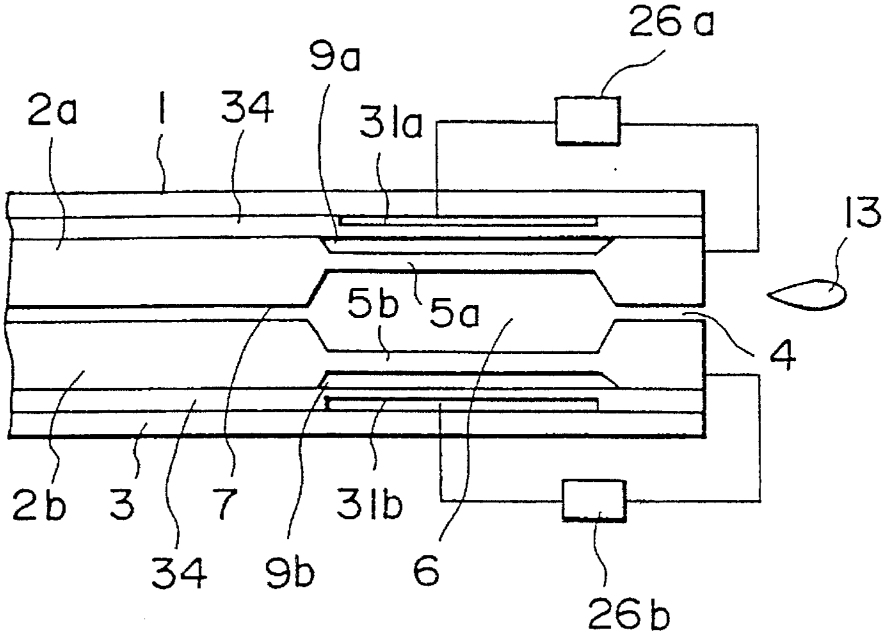
FIG. 6 is a sectional view of a second embodiment of the present invention.

FIG. 6 is a sectional view of a second embodiment of the present invention showing an edge ink-jet type apparatus similarly to the first embodiment.

In this embodiment, the upper and lower walls of the ejection chamber 6 are used as diaphragms **5*a* and 5*b*. Therefore, two intermediate substrates 2*a* and 2*b* are used and stuck to each other through the ejection chamber 6. The diaphragms 5*a* and 5*b* and vibration chambers 9*a* and 9*b* are respectively formed in the substrates 2*a* and 2*b*. The substrates 2*a* and 2*b* are arranged symmetrically with respect to a horizontal plane so that the diaphragms 5*a* and 5*b* form the upper and lower walls of the ejection chamber 6. The nozzle opening 4 is formed in an edge junction surface between the two substrates 2*a* and 2*b*. Further, electrodes 31*a* and 31*b* are respectively provided on the lower surface of the upper substrate 1 and on the upper surface of the lower substrate 3 and respectively mounted into the vibration chambers 9*a* and 9*b*. Oscillation circuits 26*a* and 26*b* connected respectively between the electrode 31*a* and the intermediate substrate 2*a* and between the electrode 31*b* and the intermediate substrate 2*b***.

In this embodiment, the diaphragms **5*a* and 5*b* can be driven by a lower voltage because an ink drop 13 can be ejected from the nozzle opening 4 by symmetrically vibrating the upper and lower diaphragms 5*a* and 5*b* of the ejection chamber 6 through the electrodes 31*a* and 31*b*. The pressure in the ejection chamber 6 is increased by the diaphragms 5*a* and 5*b*** vibrating symmetrically with respect to a horizontal plane, so that the printing speed is improved.

Embodiment 3

The following embodiments show face ink-jet type apparatus in which ink drops are ejected from nozzle openings provided in a surface of a substrate. The object of the embodiments is to drive diaphragms by a lower voltage. The embodiments can be applied to the aforementioned edge ink jet type apparatus.

Figure 7:
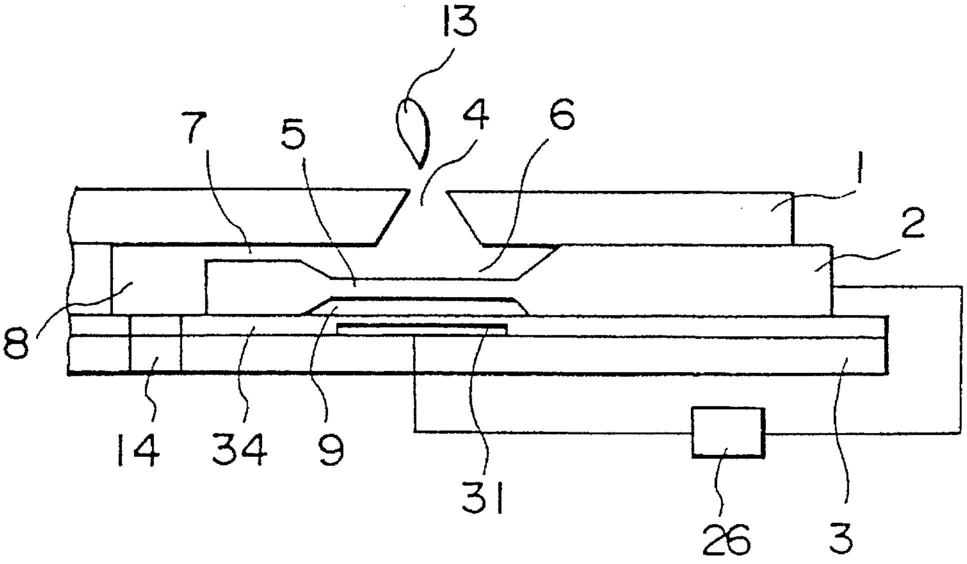
FIG. 7 is a sectional view of a third embodiment of the present invention.

FIG. 7 shows a third embodiment of the present invention in which each circular nozzle opening 4 is formed in an upper substrate 1 just above an ejection chamber 6. The bottom wall of the ejection chamber 6 is used as a diaphragm 5. The diaphragm 5 is formed on an intermediate substrate 2. Further, an electrode 31 is formed on a lower substrate 3 and in a vibration chamber 9 under the diaphragm 5. An ink supply port 14 is provided in the lower substrate 3.

In this embodiment, an ink drop 13 is ejected from the nozzle opening 4 provided in the upper substrate, through the vibration of the diaphragm 5. Accordingly, a large number of nozzle openings 4 can be provided in one head, so that high-density recording can be made.

Embodiment 4

Figure 8:
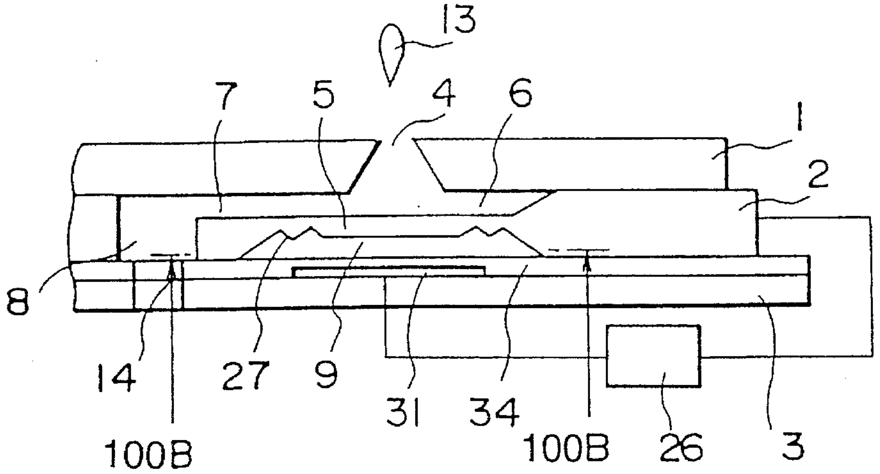
FIG. 8 is a sectional view of a fourth embodiment of the present invention.
Figure 9A:
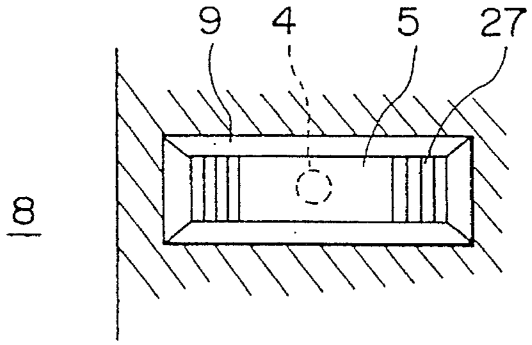
FIGS. 9A and 9B are views taken on line 100B of FIG. 8 and showing the case where bellows grooves are formed on the two opposite sides of the diaphragm and the case where bellows grooves are formed on all the four sides of the diaphragm.
Figure 9B:
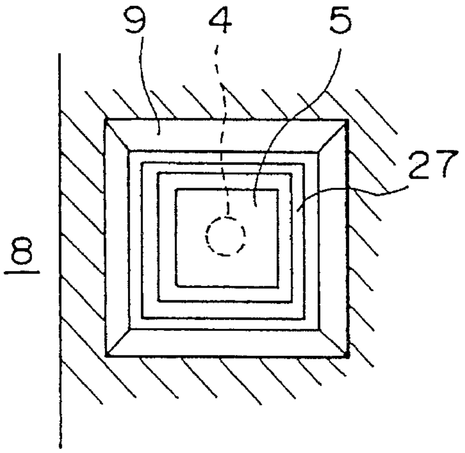
Figure 10:
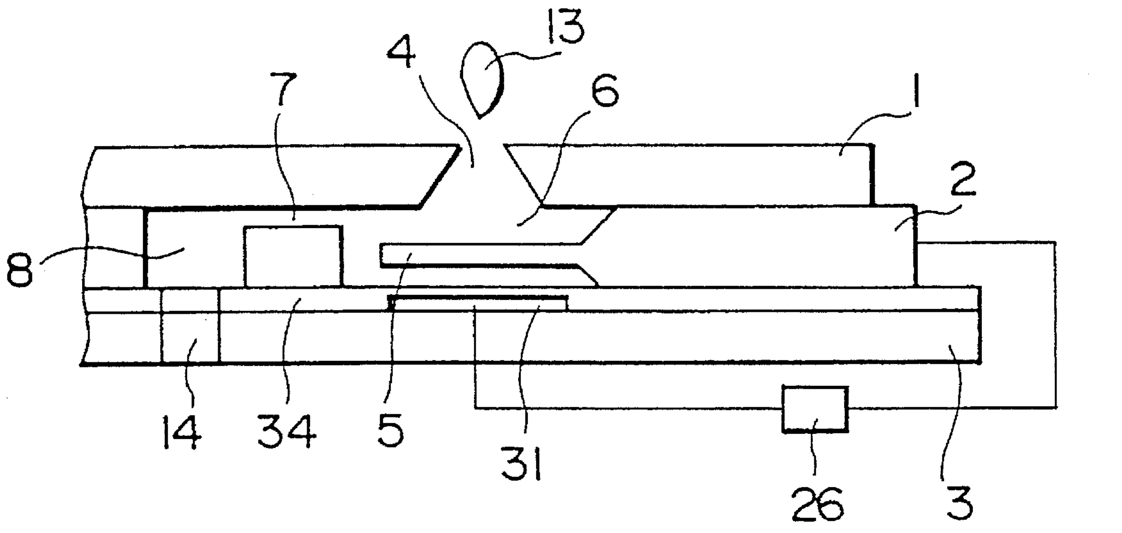
FIG. 10 is a sectional view of a fifth embodiment of the present invention.

In this embodiment, as shown in FIGS. 8, 9A and 9B, each diaphgragm 5 is supported by at least one bellows-shaped groove 27 provided on the two opposite sides (see FIG. 9A) or four sides (see FIG. 9B) of a rectangular diaphragm 5 to thereby make it possible to increase the quantity of displacement of the diaphragm 5. Ink in the ejection chamber 6 can be pressed by a surface of the diaphragm 5 perpendicular to the direction of ejection of ink, so that the ink drop 13 can be flown straight.

Embodiment 5

In this embodiment, the rectangular diaphragm 5 is formed as a cantilever type diaphragm supported by one short side thereof. By making the diaphragm 5 be of the cantilever type, the quantity of displacement of the diaphragm 5 can be increased without making the driving voltage high. Because the ejection chamber 6 becomes communicated with the vibration chamber, however, it is necessary that insulating ink is used as the ink 11 to secure electrical insulation of the ink from the electrode 31.

Embodiment 6

Figure 11:
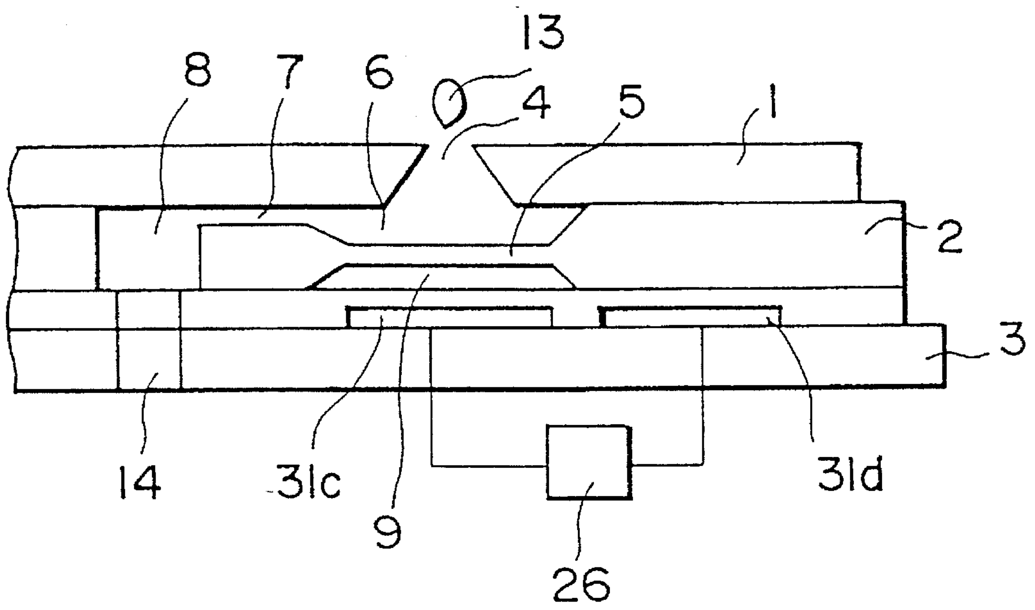
FIG. 11 is a sectional view of a sixth embodiment of the present invention.

In this embodiment, two electrodes 31*c* and 31*d* are provided for each diaphragm 5 as shown in FIG. 11 so that the two electrodes 31*c* and 31*d* drive the diaphragm 5.

In this embodiment, the first electrode 31*c* is arranged inside a vibration chamber 9, and, on the other hand, the second electrode 31*d* is arranged outside the vibration chamber 9 and under an intermediate substrate 2. An oscillation circuit 26 is connected between the two electrodes 31*c* and 31*d*, and ON-OFF of the voltage application to the electrodes 31*c* and 31*d* is repeated to thereby drive the diaphragm 5.

According to this structure, the driving portion is electrically independent because the silicon substrate 2 is not used as a common electrode unlike the previous embodiment. Accordingly, ejection of ink from an unexpected nozzle opening can be prevented when a nozzle head adjacent thereto is driven. Further, in the case of using a high resistance silicon substrate, or in the case where a high resistance layer is formed, though not shown n FIG. 11, on the surface of the silicon substrate 2, pulse voltages opposite to each other in polarity may be alternately applied to the two electrodes 31*c* and 31*d* to thereby drive the diaphragm 5. In this case, not only electrostatic attraction as described above but repulsion act on the diaphragm 5. Accordingly, ejection pressure can be increased by a lower voltage.

Embodiment 7

Figure 12:
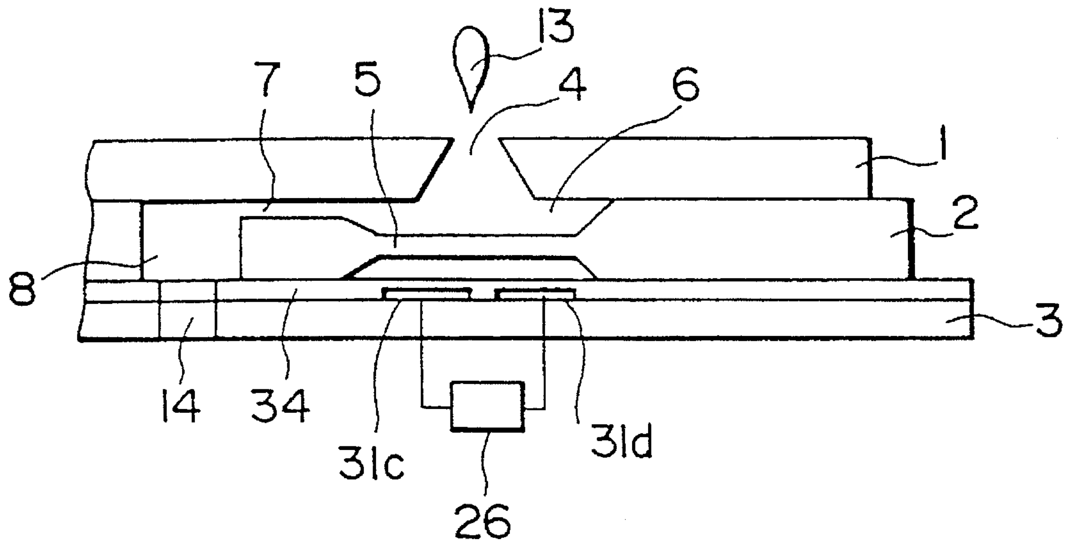
FIG. 12 is a sectional view of a seventh embodiment of the present invention.

In this embodiment, as shown in FIG. 12, both of the electrode 31*c* and 31*d* are arranged inside the vibration chamber 9 so that the diaphragm 5 is driven by surface polarization of silicon. That is, in the same manner as in the embodiment of FIG. 11, ON-OFF of the voltage application to the electrodes 31*c* and 31*d* is repeated to thereby drive the diaphragm 5. Further, in the same manner as in the Embodiment 6, in the case of using a high resistance silicon substrate, or in the case where a high resistance layer is formed, though not shown in FIG. 12, on the surface of the silicon substrate 2, pulse voltages opposite to each other in polarity may be alternately applied to the two electrodes 31*c* and 31*d* to thereby drive the diaphragm 5. This embodiment is however different from the embodiment of FIG. 11 in that there is no projection of the electrodes between the intermediate substrate 2 and the lower substrate 3. Accordingly, in this embodiment, the two substrates can be bonded with each other easily.

Embodiment 8

Figure 13:
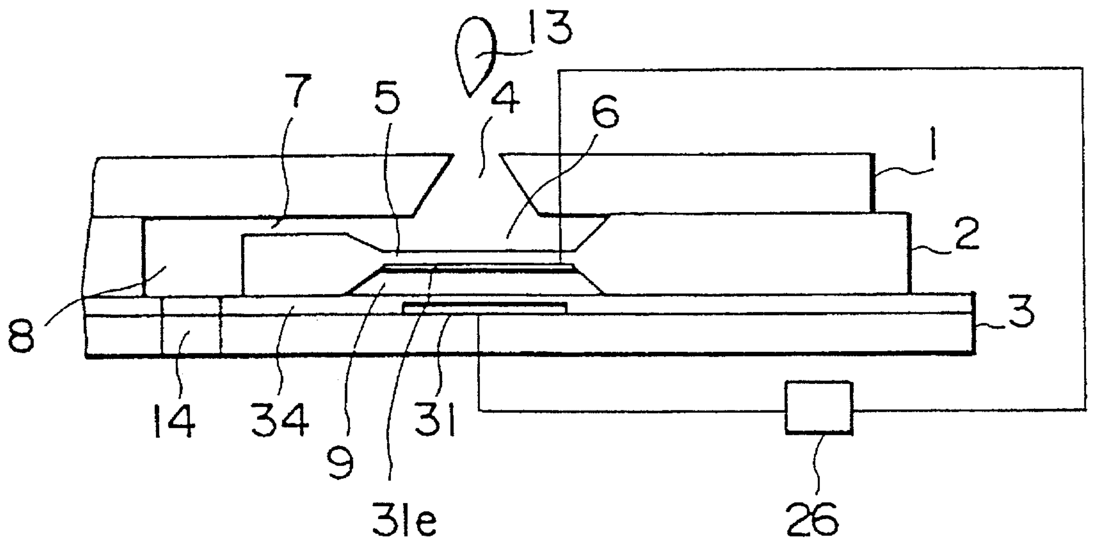
FIG. 13 is a sectional view of an eighth embodiment of the present invention.

In this embodiment, as shown in FIG. 13, a metal electrode 31*e* is provided on the lower surface of the diaphragm 5 so as to be opposite to the electrode 31. Because electric charge is not supplied to the diaphragm 5 through the silicon substrate 2 but supplied to the metal electrode 31*e* formed on the diaphragm 5 through metal patterned lines, the charge supply rate can be to increased to thereby make high-frequency driving possible.

Embodiment 9

Figure 14:
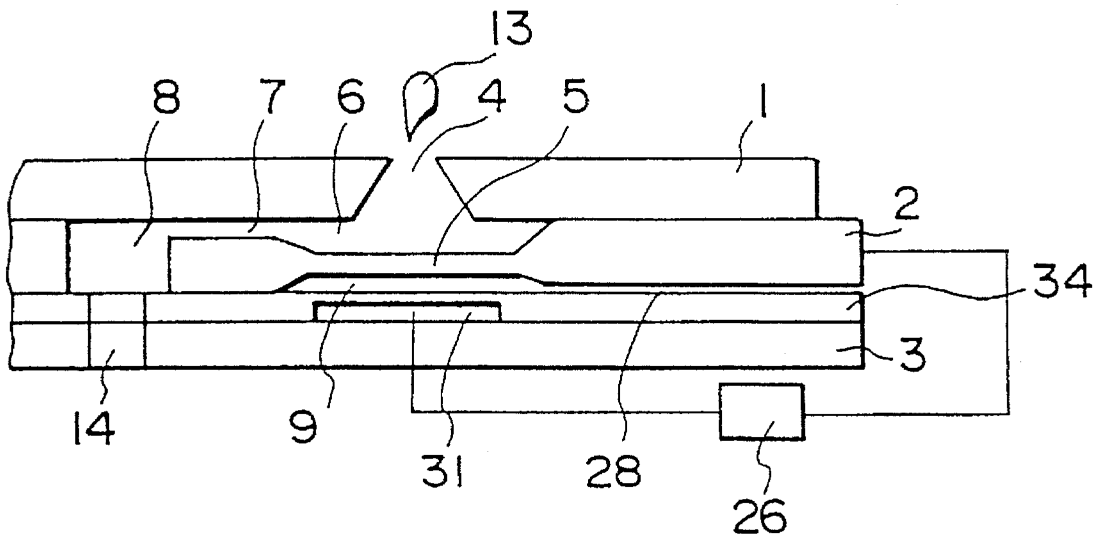
FIG. 14 is a sectional view of a ninth embodiment of the present invention.

In this embodiment, as shown in FIG. 14, an air vent or passage 28 is provided to well vent air in the vibration chamber 9. Because the diaphragm 5 cannot be vibrated easily when the vibration chamber 9 just under the diaphragm 5 is high in air tightness, the air vent 28 is provided between the intermediate substrate 2 and the lower substrate 3 in order to release the pressure in the vibration chamber 9.

Embodiment 10

Figure 15:
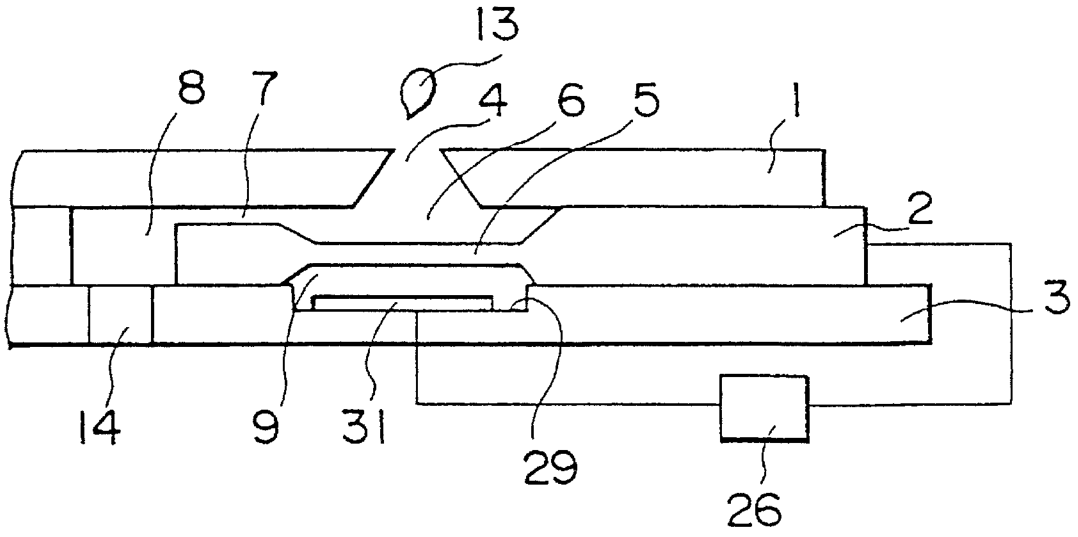
FIG. 15 is a sectional view of a tenth embodiment of the present invention.

In this embodiment, as shown in FIG. 15, the electrode 31 for driving the diaphragm 5 is formed in a concave portion 29 provided in the lower substrate 3. The short circuit of electrodes caused by the vibration of the diaphragm 5 can be prevented without providing any insulating film for the electrode 31.

In the following, an embodiment of a method for producing the aforementioned ink-jet head 12 is described. Description will be made with respect to the structure of FIG. 1 as the central subject. The nozzle grooves 4, the diaphragm 5, the ejection chambers 6, the orifices 7, the ink cavity 8, the vibration chambers 9, etc., are formed in the intermediate substrate (which is also called "nozzle substrate") 2 through the following steps.

Figure 16A:
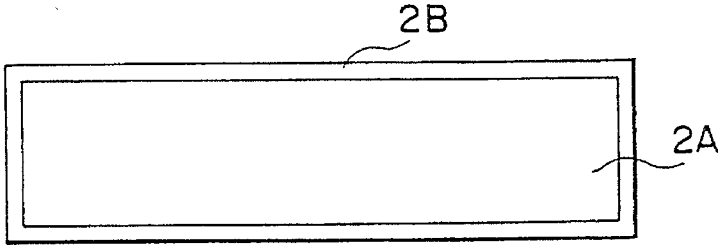
FIGS. 16*a–f* shows views of the steps of producing the nozzle substrate according to the present invention.

(1) Silicon Thermally Oxidizing Step (Diagram of FIG. 16A)

A silicon monocrystal substrate 2A of face orientation (100) was used. Both the opposite surfaces of the substrate 2A were polished to a thickness of 280 μm. Silicon was thermally oxidized by heating the Si substrate 2A in the air at 1100° C. for an hour to thereby form a 1 μm-thick oxide film 2B of $SiO_2$ on the whole surface thereof.

Figure 16B:
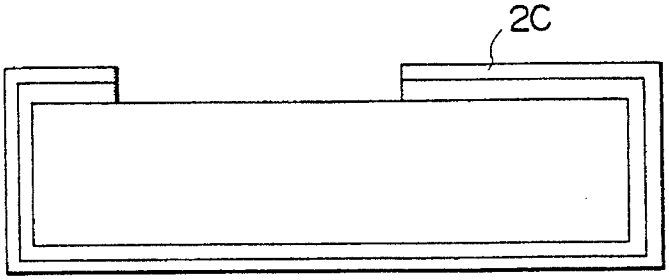
Figure 16C:
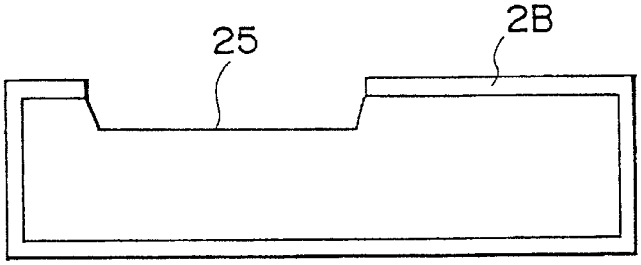

(2) Patterning Step (Diagram of FIG. 16B)

A resist pattern 2C was formed through the steps of: successively coating the two surfaces of the Si substrate 2A with a resist (OMR-83 made by TOKYO OHKA) by a spin coating method to form a resist film having a thickness of about 1 μm; and making the resist film subject to exposure and development to form a predetermined pattern. The pattern determining the form of the diaphragm 5 was a rectangle with a width of 1 mm and with a length of 5 mm. In the embodiment of FIG. 7, the form of the diaphragm was a square having an each side length of 5 mm.

Then, the $SiO_2$ film 2B was etched under the following etching condition as shown in the drawing. While a mixture solution containing six parts by volume of 40 wt % ammonium fluoride solution to one of 50 wt % hydrofluoric acid was kept at 20° C., the aforementioned substrate was immersed in the mixture solution for 10 minutes.

(3) Etching Step (Diagram of FIG. 16)

The resist 2C was separated under the following etching condition. While a mixture solution containing four parts by volume of 98 wt % sulfuric acid to one of 30 wt % hydrogen peroxide was heated to 90° C. or higher, the substrate was immersed in the mixture solution for 20 minutes to separate the resist 2C. Then, the Si substrate 2A was immersed in a solution of 20 wt % KOH at 80° C. for a minute to perform etching by a depth of 1 μm. A concave portion 25 constituting a vibration chamber 9 was formed by the etching.

Figure 16D:
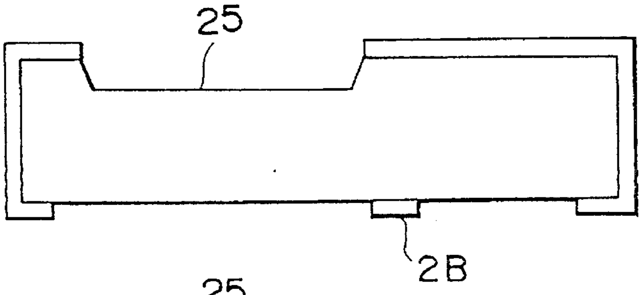

(4) Opposite Surface Patterning Step (Diagram of FIG. 16D)

The $SiO_2$ film remaining in the Si substrate 2A was completely etched in the same condition as in the step (2). Then, a 1 μm-thick $SiO_2$ film was formed over the whole surface of the Si substrate 2A by thermal oxidization through the same process as shown in the steps (1) and (2). Then, the $SiO_2$ film 2B on the opposite surface (the lower surface in the drawing) of the Si substrate 2A was etched into a predetermined pattern through a photolithographic process. The pattern determined the form of the ejection chamber 6 and the form of the ink cavity 8.

Figure 16E:
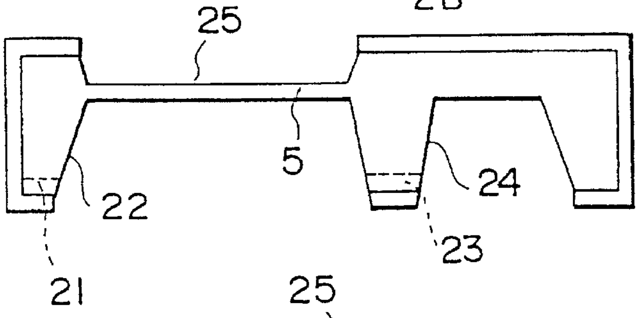

(5) Etching Step (Diagram of FIG. 16E)

The Si substrate 2A was etched by using the $SiO_2$ film as a resist through the same process in the step (3) to thereby form concave portions 22 and 24 for the ejection chamber 6 and the ink cavity 8. At the same time, a groove 21 for the nozzle opening 4 and the groove 23 of an orifice 7 were formed. The thickness of the diaphragm 5 was 100 μm.

In respect to the nozzle groove and the orifice groove, the etching rate in the KOH solution became very slow when the (111) face of the Si substrate appeared in the direction of etching. Accordingly, the etching progressed no more, so that the etching was stopped with the shallow depth. When, for example, the width of the nozzle groove is 40 μm, the etching is stopped with the depth of about 28 μm. In the case of the ejection chamber or the ink cavity, it can be formed sufficiently deeply because the width is sufficiently larger than the etching depth. That is, portions different in depth can be formed at once by an etching process.

Figure 16F:
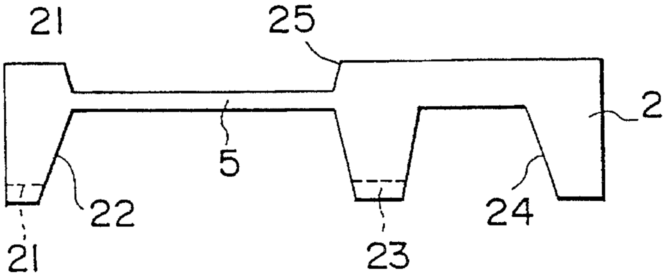

(6) $SiO_2$ Film Removing Step (Diagram of FIG. 16F)

Finally, a nozzle substrate having parts 21, 22, 23, 24, 25 and 5, or in other words, an intermediate substrate 2, was prepared by removing the remaining $SiO_2$ film by etching.

In the embodiment of FIG. 7, an intermediate substrate having the aforementioned parts 22, 23, 24, 25 and 5 except the nozzle grooves 21 and a nozzle substrate (upper substrate 1) having nozzle openings 4 with the diameter 50 μm on a 280 μm-thick Si substrate were prepared in the same process as described above.

In the following, a method for forming an electrode substrate (lower substrate 3) is described with reference to FIG. 17.

Figure 17A:
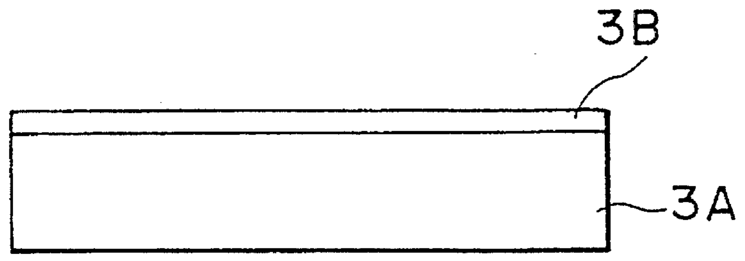
FIGS. 17*a–c* shows views of the steps of producing the electrode substrate according to the present invention.

(1) Metal Film Forming Step (Diagram of FIG. 17A)

A 1000 A-thick Ni film 3B was formed on a surface of a 0.7 mm-thick Pyrex glass substrate 3A by a sputtering method.

Figure 17B:
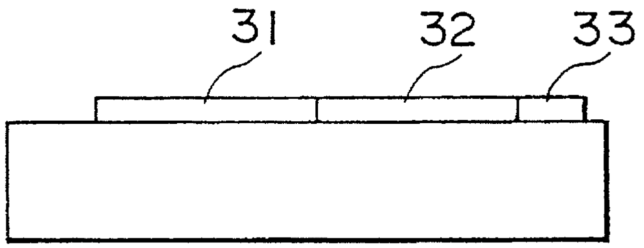

(2) Electrode Forming Step (Diagram of FIG. 17B)

The Ni film 3B was formed into a predetermined pattern by a photolithographic etching technique. Thus, the electrodes 31, the lead portions 32 and the terminal portions 33 were formed.

Figure 17C:
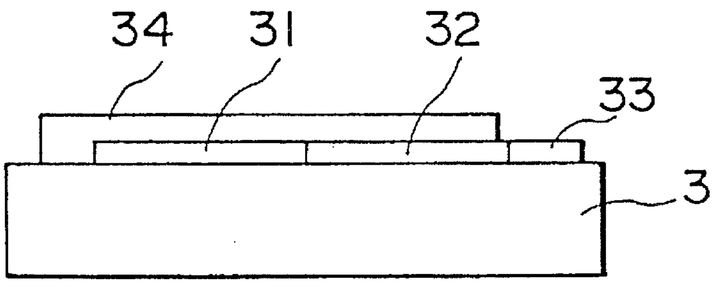

(3) Insulating Film Forming Step (Diagram of FIG. 17C)

Finally, the electrodes 31 and the lead portions 32 (see FIG. 1) except the terminal portions 33 were completely coated with an $SiO_2$ film as an insulating film by a mask sputtering method to form a film thickness of about 1 μm to thereby prepare the electrode substrate 3.

The nozzle substrate 2 and the electrode substrate 3 prepared as described above were stuck to each other through anodic bonding. That is after the Si substrate 2 and the glass substrate 3 were put on each other, the substrates were put on a hot plate. While the substrates were heated at 300° C., a DC voltage of 500 V was applied to the substrates for 5 minutes with the Si substrate side used as an anode and with the glass substrate side used as a cathode to thereby stick the substrates to each other. Then, the glass substrate (upper substrate 1) having the ink supply port 14 formed therein was stuck onto the Si substrate 2 through the same anodic treatment.

In the embodiment of FIG. 7, the nozzle substrate 1 and the Si substrate 2 were stuck on each other through thermal compression.

The ink-jet heads 12 respectively shown in FIGS. 2 and 7 were produced through the aforementioned process.

What is claimed is:

1. A method for producing an ink-jet head comprising the steps of:

anisotropically etching a silicon substrate (2) on a first surface thereof to form a plurality of communicating concave portions (22, 24) delineating a plurality of separate ejection chambers (6), a common cavity (8) and a plurality of ink inlets (7);

forming by means of anisotropic etching at least one groove (23) with each of said plurality of ink inlets (7) providing communication between a respective end of an ejection chamber (6) and the common cavity (8);

forming nozzle openings (4) at equal intervals along a first surface of a first insulating substrate (1) providing communication between a respective end of an ejection chamber (6);

bonding the first surface of the insulating substrate (1) to the first surface of the silicon substrate (2) sealing the rims of ejection chambers (6), the ink inlets (7) and the common cavity (8) to enclose the same while maintaining the communication therebetween with each of the nozzle openings (4) in communication with ejection chambers (6);

forming a plurality of aligned electrodes (31) on a second insulating substrate (3); and bonding the second insulating substrate (3) to a second surface of the silicon substrate (2), opposite the first surface, such that corresponding electrodes (31)are aligned adjacent to corresponding diaphragms (5) with a gap (C) formed therebetween.

2. The method as claimed in claim 1 wherein said second insulating substrate (3) is bonded to the surface of the silicon substrate (2) opposite said first surface by anodic bonding.

3. The method as claimed in claim 2 comprising the further step of forming an insulating layer (34) on said electrodes (31).

4. The method as claimed in claim 1 including the step of anisotropically etching the silicon substrate (2) on a second surface thereof to form a plurality of communicating concave portions (25) each aligned opposite to a respective ejection chamber (6) formed in the first surface thereof forming a respective thin diaphragm (5) at a bottom wall of each of the ejection chambers (6).

5. The method as claimed in claim 4 comprising the further step of forming an insulating layer (34) on said electrodes (31).

6. The method as claimed in claim 1 including the step of providing said second insulating substrate (3) to have a concave portion (29) on which said electrodes (31) are formed.

7. The method as claimed in claim 6 comprising the further step of forming an insulating layer (34) on said electrodes (31).

8. The method as claimed in claim 1 comprising the further step of forming an insulating layer (34) on said electrodes (31).

9. The method as claimed in claim 1 wherein the step of anisotropically etching said first surface of said silicon substrate further comprises the step of forming nozzle grooves (21) at equal intervals along said first surface in communication with said concave portion (22) and bisecting one edge of said silicon substrate (2) to form nozzle openings (4).

10. The method as claimed in claim 1 wherein nozzle openings (4) are at equal intervals along the first surface of said first insulating substrate (1), each nozzle opening (4) being in communication with a respective ejection chamber (6).

11. The method as claimed in claim 1 wherein said ink inlets (7) comprise a plurality of adjacently aligned orifice grooves (23) between said formed concave portions (22) and (24).

12. The method as claimed in claim 11 respective including the step of carrying out the step of etching grooves (23) so that the formed nozzle grooves (21) have a larger cross sectional circumference than the individually formed ink inlet grooves (23).

13. A method for producing an ink-jet head comprising the steps of:

anisotropically etching on a first surface of a pair of silicon substrates (2*a*, 2*b*) to form a plurality of concave portions (22) for ejection chambers (6) and a plurality of nozzle grooves (21) each communicating at one end thereof with one end of each of said concave portions (22) and opening at the other end thereof out of one edge of the silicon substrate (2);

forming spatially separated grooves (23) communicating with a respective end of each of the concave portions (22) serving as an ink inlet (7) for respective ejection chambers (6);

anisotropically etching the silicon substrates (2*a*, 2*b*) on a second surface thereof, opposite of the first surfaces, to form a plurality of communicating concave portions (25) each aligned opposite to a respective ejection chamber (6) formed in the first surface thereof forming a respective thin diaphragm (5) at a bottom wall of each of the ejection chambers (6);

bonding together the first surfaces of said silicon substrates (2*a*, 2*b*) forming said ejection chambers (6) from said concave portions (22), said ink inlets (7) and nozzle openings (4) in communication with each other;

forming electrodes (31*a*, 31*b*) on a first surface of a pair of second insulating substrates (1, 3); and bonding said second insulating substrates (1, 3) respectively to the second surface of said silicon substrates (2*a*, 2*b*) such that said electrodes (31*a*, 31*b*) are in facing relation respectively with said diaphragms (5*a*, 5*b*) forming a gap (C) therebetween.

14. The method as claimed in claim 13 further including the step of anisotropically etching a group of adjacently disposed, spatially separated grooves (23) with each of said plurality of ink inlets (7) providing plural communication between a respective end of an ejection chamber (6) and the common cavity (8).

15. A method for producing an ink-jet head as claimed in claim 8, characterized in that, after the completion of said second process, an additional fourth process for insulating layer (34) on said electrodes (31) is carried out.

* * * * *

UNITED STATES PATENT AND TRADEMARK OFFICE
Certificate

Patent No. 5,513,431 Patented: May 7, 1996

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Yoshihiro Ohno, Mitsuro Atobe, and Hitoshi Tanbo.

Signed and Sealed this Second Day of June, 1998.

LARRY I. SCHWARTZ, *SPE*
Art Unit 3726